US010065394B2

(12) United States Patent
Tang et al.

(10) Patent No.: US 10,065,394 B2
(45) Date of Patent: Sep. 4, 2018

(54) ROOFING MEMBRANES WITH PRE-APPLIED, CURED, PRESSURE-SENSITIVE SEAM ADHESIVES

(71) Applicant: FIRESTONE BUILDING PRODUCTS CO., LLC, Indianapolis, IN (US)

(72) Inventors: Jiansheng Tang, Westfield, IN (US); Joseph Carr, Indianapolis, IN (US); William R. McJunkins, Indianapolis, IN (US); Michael J. Hubbard, Anderson, IN (US); Carl E. Watkins, Jr., Indianapolis, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 0 days.

(21) Appl. No.: 15/124,150

(22) PCT Filed: Mar. 6, 2015

(86) PCT No.: PCT/US2015/019219
§ 371 (c)(1),
(2) Date: Sep. 7, 2016

(87) PCT Pub. No.: WO2015/134889
PCT Pub. Date: Sep. 11, 2015

(65) Prior Publication Data
US 2017/0015083 A1    Jan. 19, 2017

Related U.S. Application Data

(60) Provisional application No. 61/949,317, filed on Mar. 7, 2014.

(51) Int. Cl.
B32B 7/12 (2006.01)
B32B 23/04 (2006.01)
(Continued)

(52) U.S. Cl.
CPC .............. *B32B 7/12* (2013.01); *B32B 7/00* (2013.01); *B32B 7/02* (2013.01); *B32B 7/04* (2013.01);
(Continued)

(58) Field of Classification Search
CPC .... B32B 7/00; B32B 7/04; B32B 7/12; B32B 7/02; B32B 23/00; B32B 23/04;
(Continued)

(56) References Cited

U.S. PATENT DOCUMENTS 3,935,353 A    1/1976    Doerfling et al.
4,404,243 A    9/1983    Terpay
(Continued)

FOREIGN PATENT DOCUMENTS

CA    2809955 A1    5/2013
EP    0342811 B1    7/1995
(Continued)

OTHER PUBLICATIONS

International Search Report of PCT/US2015/019219 dated Apr. 17, 2015.

*Primary Examiner* — Patricia L. Nordmeyer
(74) *Attorney, Agent, or Firm* — Brian D. McAlhaney; Arthur M. Reginelli

(57) ABSTRACT

A membrane composite comprising a polymeric membrane panel, an adhesive layer, and a release liner, where the adhesive layer is a pressure-sensitive adhesive that is at least partially cured, and includes at least two distinct regions with the at least two regions having distinct states of cure.

14 Claims, 2 Drawing Sheets

(51) Int. Cl.

| | | |
|---|---|---|
| *B32B 25/08* | (2006.01) | |
| *E04D 5/10* | (2006.01) | |
| *C09J 133/02* | (2006.01) | |
| *E04D 5/14* | (2006.01) | |
| *B32B 23/08* | (2006.01) | |
| *B32B 27/06* | (2006.01) | |
| *B32B 7/00* | (2006.01) | |
| *B32B 7/02* | (2006.01) | |
| *B32B 7/04* | (2006.01) | |
| *B32B 23/00* | (2006.01) | |
| *B32B 25/00* | (2006.01) | |
| *B32B 25/04* | (2006.01) | |
| *B32B 27/00* | (2006.01) | |
| *B32B 27/08* | (2006.01) | |
| *B32B 27/26* | (2006.01) | |
| *B32B 27/28* | (2006.01) | |
| *B32B 27/30* | (2006.01) | |
| *B32B 27/32* | (2006.01) | |
| *C09J 7/38* | (2018.01) | |
| *C09J 7/22* | (2018.01) | |
| *C09J 7/20* | (2018.01) | |
| *C09J 7/24* | (2018.01) | |
| *C09J 7/21* | (2018.01) | |

(52) U.S. Cl.
   CPC .............. *B32B 23/00* (2013.01); *B32B 23/04* (2013.01); *B32B 23/046* (2013.01); *B32B 23/08* (2013.01); *B32B 25/00* (2013.01); *B32B 25/04* (2013.01); *B32B 25/08* (2013.01); *B32B 27/00* (2013.01); *B32B 27/06* (2013.01); *B32B 27/08* (2013.01); *B32B 27/26* (2013.01); *B32B 27/28* (2013.01); *B32B 27/30* (2013.01); *B32B 27/308* (2013.01); *B32B 27/32* (2013.01); *C09J 7/201* (2018.01); *C09J 7/21* (2018.01); *C09J 7/22* (2018.01); *C09J 7/243* (2018.01); *C09J 7/38* (2018.01); *C09J 133/02* (2013.01); *E04D 5/10* (2013.01); *E04D 5/148* (2013.01); *B32B 2307/712* (2013.01); *B32B 2307/7242* (2013.01); *B32B 2307/7265* (2013.01); *B32B 2307/73* (2013.01); *B32B 2419/00* (2013.01); *B32B 2419/06* (2013.01); *C09J 2201/40* (2013.01); *C09J 2409/006* (2013.01); *C09J 2433/00* (2013.01)

(58) Field of Classification Search
   CPC ......... B32B 23/08; B32B 25/00; B32B 25/04; B32B 25/08; B32B 27/00; B32B 27/06; B32B 27/08; B32B 27/26; B32B 27/28; B32B 27/30; B32B 27/308; B32B 27/32; B32B 23/046; B32B 2307/712; B32B 2307/7242; B32B 2307/7265; B32B 2307/73; B32B 2419/00; B32B 2419/06; E04D 5/10; E04D 5/148; C09J 133/02; C09J 7/0275; C09J 7/025; C09J 7/0246; C09J 7/046; C09J 2409/006; C09J 2201/40; C09J 2433/00; Y10T 428/14; Y10T 428/141
   See application file for complete search history.

(56) References Cited

U.S. PATENT DOCUMENTS

| | | |
|---|---|---|
| 4,585,682 A | 4/1986 | Colarusso et al. |
| 4,908,229 A | 3/1990 | Kissel |
| 4,943,461 A | 7/1990 | Karim |
| 5,073,611 A | 12/1991 | Rehmer et al. |
| 5,086,088 A | 2/1992 | Kitano et al. |
| 5,128,386 A | 7/1992 | Rehmer et al. |
| 5,242,727 A | 9/1993 | Briddell et al. |
| 5,253,461 A | 10/1993 | Janoski et al. |
| 5,264,533 A | 11/1993 | Rehmer et al. |
| 5,317,035 A | 5/1994 | Jacoby et al. |
| 5,374,477 A | 12/1994 | Lawless et al. |
| 5,389,699 A | 2/1995 | Rehmer et al. |
| 5,456,785 A | 10/1995 | Venable |
| 5,496,615 A | 3/1996 | Bartlett et al. |
| 5,686,179 A | 11/1997 | Cotsakis |
| 5,880,241 A | 3/1999 | Brookhart et al. |
| 5,895,301 A | 4/1999 | Porter et al. |
| 6,080,818 A | 6/2000 | Thakker et al. |
| 6,184,496 B1 | 2/2001 | Pearce |
| 6,218,493 B1 | 4/2001 | Johnson et al. |
| 6,262,144 B1 | 7/2001 | Zhao et al. |
| 6,297,324 B1 | 10/2001 | Briddell et al. |
| 6,299,936 B1 | 10/2001 | Reck et al. |
| 6,306,460 B1 | 10/2001 | Reck et al. |
| 6,310,163 B1 | 10/2001 | Brookhart et al. |
| 6,348,530 B1 | 2/2002 | Reck et al. |
| RE37,683 E | 4/2002 | Briddell et al. |
| 6,569,970 B2 | 5/2003 | Reck et al. |
| 6,586,080 B1 | 7/2003 | Heifetz |
| 6,605,662 B2 | 8/2003 | Zhao et al. |
| 6,641,896 B2 | 11/2003 | Fensel et al. |
| 6,683,126 B2 | 1/2004 | Keller et al. |
| 6,776,322 B2 | 8/2004 | Villela et al. |
| 6,794,449 B2 | 9/2004 | Fisher |
| 6,813,866 B2 | 11/2004 | Naipawer, III |
| 6,828,020 B2 | 12/2004 | Fisher et al. |
| 6,841,608 B1 | 1/2005 | Dreher et al. |
| 6,858,315 B2 | 2/2005 | Khan et al. |
| 6,863,944 B2 | 3/2005 | Naipawer, III et al. |
| 6,887,917 B2 | 5/2005 | Yang et al. |
| 6,895,724 B2 | 5/2005 | Naipawer, III |
| 6,901,712 B2 | 6/2005 | Lionel |
| 7,066,371 B2 | 6/2006 | Villela et al. |
| 7,101,598 B2 | 9/2006 | Hubbard |
| 7,115,313 B2 | 10/2006 | Zanchetta et al. |
| 7,132,143 B2 | 11/2006 | Zanchetta et al. |
| 7,148,160 B2 | 12/2006 | Porter |
| 7,323,242 B2 | 1/2008 | Gerst et al. |
| 7,368,155 B2 | 5/2008 | Larson et al. |
| 7,473,734 B2 | 1/2009 | Beckley et al. |
| 7,517,934 B2 | 4/2009 | Deeter et al. |
| 7,575,653 B2 | 8/2009 | Johnson et al. |
| 7,589,145 B2 | 9/2009 | Brant et al. |
| 7,614,194 B2 | 11/2009 | Shah |
| 7,645,829 B2 | 1/2010 | Tse et al. |
| 7,744,998 B2 | 6/2010 | Nakamuta |
| 7,771,807 B2 * | 8/2010 | Hubbard .................. E04D 5/10 428/141 |
| 7,776,417 B2 | 8/2010 | Mohseen et al. |
| 7,914,868 B2 | 3/2011 | Naipawer, III et al. |
| 8,063,141 B2 | 11/2011 | Fisher |
| 8,153,220 B2 | 4/2012 | Nebesnak et al. |
| 8,202,596 B2 | 6/2012 | Yang et al. |
| 8,206,817 B2 | 6/2012 | Donovan et al. |
| 8,241,446 B2 | 8/2012 | Naipawer, III et al. |
| 8,262,833 B2 | 9/2012 | Dyal et al. |
| 8,327,594 B2 | 12/2012 | Merryman et al. |
| 8,329,800 B2 | 12/2012 | Terrenoire et al. |
| 8,381,450 B2 | 2/2013 | Cummings et al. |
| 8,389,103 B2 | 3/2013 | Kiik et al. |
| 8,399,571 B2 | 3/2013 | Becker et al. |
| 8,492,472 B2 | 7/2013 | Elizalde et al. |
| 8,530,582 B2 | 9/2013 | Becker et al. |
| 9,353,293 B2 * | 5/2016 | Niimi .................... C09J 133/08 |
| 9,441,141 B2 * | 9/2016 | Niimi .................... C09J 7/00 |
| 2003/0032691 A1 | 2/2003 | Bolte |
| 2003/0215594 A1 | 11/2003 | Hamdar |
| 2004/0242763 A1 | 12/2004 | Tielemans |
| 2005/0214496 A1 | 9/2005 | Borenstein |
| 2006/0127627 A1 | 6/2006 | Larson et al. |
| 2006/0216523 A1 | 9/2006 | Takaki |
| 2007/0281119 A1 | 12/2007 | Di Stefano |
| 2008/0088056 A1 | 4/2008 | Vavra |

(56) References Cited

U.S. PATENT DOCUMENTS

| | | |
|---|---|---|
| 2010/0086712 A1 | 4/2010 | Moller |
| 2010/0279049 A1 | 11/2010 | Hubbard |
| 2010/0292403 A1 | 11/2010 | Ansems |
| 2011/0048513 A1 | 3/2011 | Booth |
| 2012/0148791 A1* | 6/2012 | Yamanaka ................ C09J 7/00 428/114 |
| 2012/0240996 A1 | 9/2012 | Keiser |
| 2013/0012287 A1 | 1/2013 | Al Ani |
| 2013/0122287 A1 | 5/2013 | Moeller |
| 2013/0225020 A1 | 8/2013 | Flood |
| 2017/0114543 A1 | 4/2017 | Tang et al. |

FOREIGN PATENT DOCUMENTS

| | | |
|---|---|---|
| GB | 2305667 A | 4/1997 |
| WO | WO 9856866 A1 | 12/1998 |
| WO | 2013142562 A2 | 9/2013 |
| WO | 2015042258 A1 | 3/2015 |
| WO | 2017049280 A1 | 3/2017 |
| WO | 2017165868 A1 | 9/2017 |
| WO | 2017165870 A1 | 9/2017 |
| WO | 2017165871 A1 | 9/2017 |

* cited by examiner

ROOFING MEMBRANES WITH PRE-APPLIED, CURED, PRESSURE-SENSITIVE SEAM ADHESIVES This application claims the benefit of U.S. Provisional Application Ser. No. 61/949,317, filed on Mar. 7, 2014, which is incorporated herein by reference.

FIELD OF THE INVENTION

Embodiments of the invention are directed toward roofing membranes that carry cured pressure-sensitive adhesive for seaming adjacent membranes positioned on a roof surface. The pressure-sensitive adhesive is advantageously applied to the membrane as a hot-melt adhesive and subsequently cured. A release liner can be applied to the pressure-sensitive adhesive, thereby allowing the membrane to be rolled, delivered to a job site, and ultimately seamed by using peel and stick techniques. Moreover, the membranes of the present invention may carry a cured pressure-sensitive adhesive for securing the membrane to a roof surface. In one or more embodiments, the same adhesive material is used to both seam adjacent membranes and secure the membranes to the roof surface, although the adhesives may be distinctly cured.

BACKGROUND OF THE INVENTION

Large, flexible polymeric sheets, which are often referred to as membranes or panels, are used in the construction industry to cover flat or low-sloped roofs. These membranes provide protection to the roof from the environment particularly in the form of a waterproof barrier. As is known in the art, commercially popular membranes include thermoset membranes such as those including cured EPDM (i.e., ethylene-propylene-diene terpolymer rubber) or thermoplastics such as TPO (i.e., thermoplastic olefins).

These membranes, which may also be referred to as panels, are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water resistant seal.

Generally, there are two modes of membrane attachment that are used in conjunction to create a water impermeable roofing membrane assembly. The first seeks to anchor the membrane to the roof, while the second seeks to create a water impervious barrier by attaching individual adjacent membrane panels to each other or to flashing. Inasmuch as these modes of membrane attachment seek entirely different goals, the mechanisms by which they operate are likewise highly distinct.

With respect to the former mode of attachment, which involves securing of the membrane to the roof, the use of adhesives allow for the formation of a fully-adhered roofing system. In other words, a majority, if not all, of the membrane panel is secured to the roof substrate, as opposed to mechanical attachment methods which can only achieve direct attachment in those locations where a mechanical fastener actually affixes the membrane.

When adhesively securing a membrane to a roof, such as in the formation of a fully-adhered system, there are a few common methods employed. The first is known as contact bonding whereby technicians coat both the membrane and the substrate with an adhesive, and then mate the membrane to the substrate while the adhesive is only partially set. Because the volatile components (e.g. solvent) of the adhesives are flashed off prior to mating, good early (green) bond strength is developed. The contact bonding method employs adhesives that may include volatile organic compounds (i.e. solvent-based adhesives). Water-based adhesives are used for contact bonding as well, but the water does not flash off quickly and therefore the use of water-based adhesives for contact bonding may be fraught with problems.

The second method is known as wet lamination, whereby technicians coat the substrate with an adhesive and then mate the membrane with the substrate while the adhesive is still wet. This method can therefore advantageously employ water-based adhesives due to the fact that the mating step can occur immediately after application of the solvent, which significantly reduces installation time. But, wet lamination can only be used when the substrate to which the membrane is being adhered is porous (e.g. wood, plywood, or OSB board), which allows the water to dissipate through the substrate.

A third mode of attachment is through the use of a pre-applied adhesive to the bottom surface of the membrane. In other words, prior to delivery of the membrane to the job site, an adhesive is applied to the bottom surface of the membrane. In order to allow the membrane to be rolled and shipped, a release paper or liner is applied to the surface of the adhesive. During installation of the membrane, the release liner is removed, thereby exposing the pressure-sensitive adhesive, and the membrane can then be secured to the roofing surface without the need for the application of additional adhesives.

As is known in the art, the pre-applied adhesive is applied to the surface of the membrane in the form of a hot-melt adhesive. For example, U.S. Publication No. 2004/0191508, which teaches peel and stick thermoplastic membranes, employs pressure-sensitive adhesive compositions comprising styrene-ethylene-butylene-styrene (SEBS), tackifying endblock resins such as cumarone-indene resin and tackifying midblock resins such as terpene resins. This publication also suggests other hot-melt adhesives such as butyl-based adhesives, EPDM-based adhesives, acrylic adhesives, styrene-butadiene adhesives, polyisobutylene adhesives, and ethylene vinyl acetate adhesives.

In view of the nature of the adhesives, peel and stick membranes have inherent limitations. Specifically, there are temperature windows that limit the minimum temperature at which the membranes can be installed on a roof surface. Also, there are maximum temperature limits on the roof surface that the adhesive can withstand while maintaining wind-uplift integrity. With respect to the latter, where the surface temperature on the roof nears the glass transition temperature of the adhesive, the adhesive strength offered by the pressure-sensitive adhesive is not maintained. As a result, peel-and-stick membranes have not gained wide acceptance in the industry. Moreover, the use of peel-and-stick membranes has been limited to use in conjunction with white membranes (e.g., white thermoplastic membranes) because the surface temperature of these membranes remains cooler when exposed to solar energy.

With respect to securing adjoining membranes, the use of pre-applied tapes is also known. For example, U.S. Publ. No. 2010/0024955 teaches membrane assemblies that carry pre-applied adhesive tapes over a pre-primed lap region. Also, U.S. Publ. No. 2004/0191588, which is discussed above with respect to peel-and-stick membranes, alludes to the desirability of a membrane assembly where all of the components are peel-and-stick, but then teaches an assembly where stronger adhesives or more moisture-resistant adhesives are used for seaming membranes while weaker, cheaper adhesives are used for the non-overlapping region (i.e., to adhere the membrane to the roof surface).

SUMMARY OF THE INVENTION

Embodiments of the present invention provide a membrane composite comprising a polymeric membrane panel, an adhesive layer, and a release liner, where the adhesive layer is a pressure-sensitive adhesive that is at least partially cured, and includes at least two distinct regions with the at least two regions having distinct states of cure.

DETAILED DESCRIPTION OF ILLUSTRATIVE EMBODIMENTS

Embodiments of the invention are based, at least in part, on the discovery of a roofing membrane having a pre-applied, pressure-sensitive adhesive applied to a planar surface thereof, where the pressure-sensitive adhesive has different states of cure within different regions of the planar surface. In one or more embodiments, the adhesive has a greater degree of cure in the lap region than in the central region of the membrane. As a result, the adhesive in the lap region has greater strength, which allows the adhesive to form a technologically useful lap seam with adjoining membranes. And, since the adhesive in the central region is less cured, it has greater tack, which allows the adhesive to bond to various roofing substrates. Advantageously, the adhesive is applied to the planar surface of the membrane as a hot-melt adhesive that is subsequently cured, and in accordance with the present invention, the degree of cure is varied between the lap region and the central region of the membrane. As a result of practicing the present invention, the membranes can be installed by exclusively using peel-and-stick techniques to install the membranes.

Membrane Construction

Practice of the present invention does not necessarily change the overall construction of the membranes of the present invention. As the skilled person understands, membranes that carry an adhesive for application by peel-and-stick methods are generally known as disclosed in U.S. Publication No. 2004/0191508, which is incorporated herein by reference.

Figure 1:
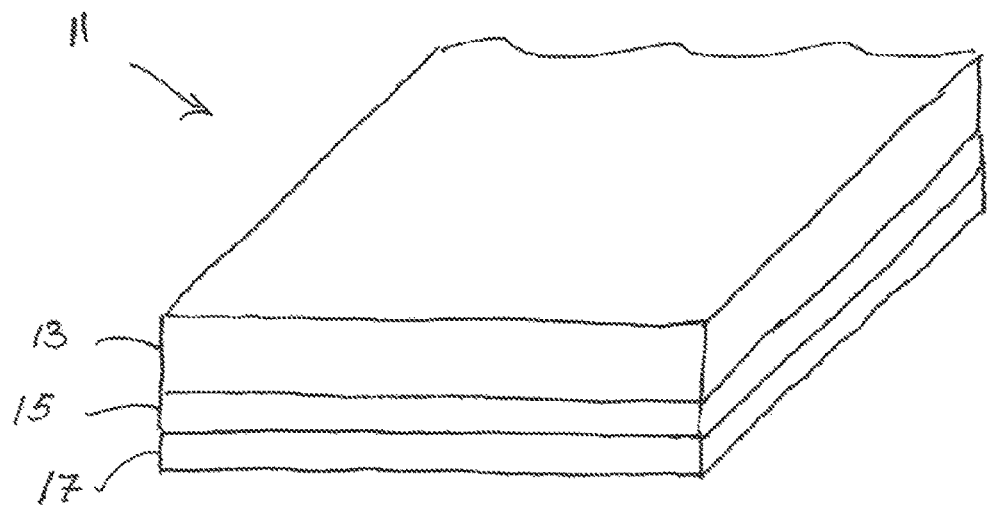
FIG. 1 is a cross-sectional perspective view of a membrane composite according to embodiments of the invention.

For example, a membrane 11, which may be referred to as a membrane composite 11, is shown in FIG. 1. Membrane composite 11 includes polymeric panel 13, pressure-sensitive adhesive layer 15, and release liner 17.

Figure 2:
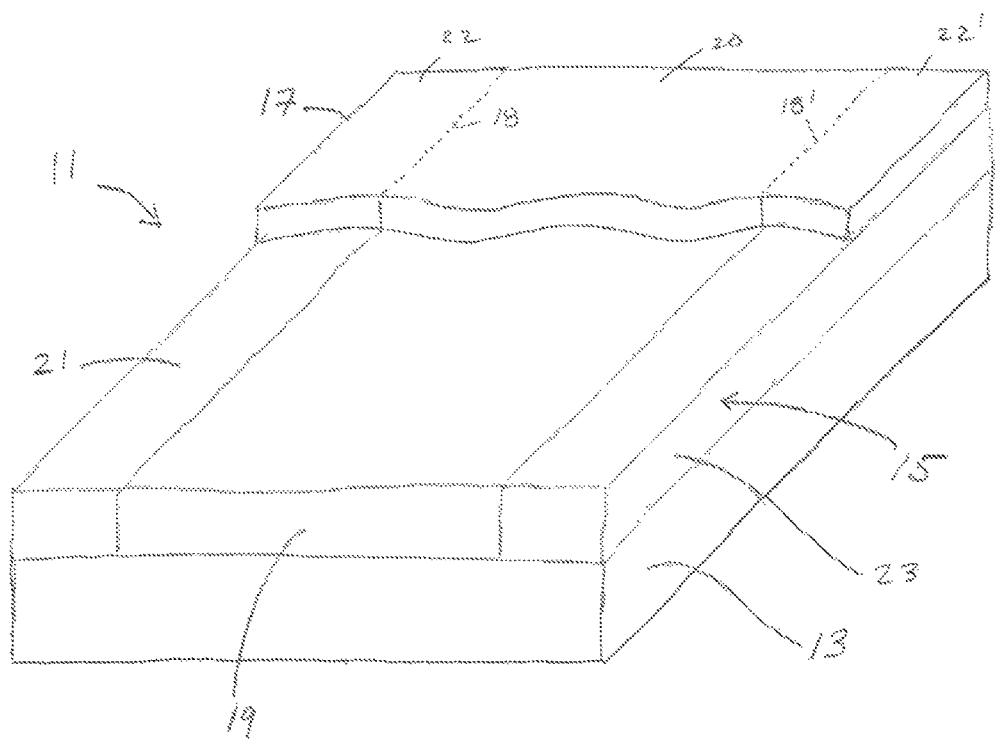
FIG. 2 is a cross-sectional perspective view of a membrane composite according to embodiments of the invention.

The various regions of the adhesive layer 15 may be described with reference to FIG. 2. Specifically, adhesive layer 15 includes central region 19, first lap region 21, and second lap region 23. As the skilled person appreciates, and as is generally shown in FIG. 2, first and second lap regions (21, 23) extend along the lateral edges of the membrane along the entire length of the membrane (i.e., along the machine direction of the membrane). Central region 19 also extends the length of the membrane.

The width of lap regions (21, 23) can vary depending upon the application, but may generally have a width greater than 1 in., in other embodiments greater than 1.5 in., and in other embodiments greater than 2 in. In these or other embodiments, the width of the lap regions may be less than 18 in., in other embodiments less than 12 in., and in other embodiments less than 8 in. In one or more embodiments, the width of the lap regions may be from about 1 to about 18 in., in other embodiments from about 1.5 to about 12 in., and in other embodiments from about 2 to about 8 in.

First and second lap regions (21, 23) and central region 19 may be compositionally similar. For example, a single hot-melt adhesive composition may be applied to the entire surface of membrane 13, and therefore this single application of hot-melt adhesive will form both first and second lap edges (21, 23), as well as central region 19. In accordance with the present invention, and as will be described in greater detail below, first and second lap regions (21, 23) may be distinguished from central region 19 based upon the degree of cure imparted to adhesive layer 15. For example, adhesive layer 15 will be cured to a greater extent within first and second lap regions (21, 23) as compared to the degree of cure imparted to adhesive layer 15 within central region 19.

In one or more embodiments, release liner 17 may be discontinuous or otherwise severed or partially severed between the various regions associated with the adhesive layer. As shown in FIG. 2, perforations 18 and 18' may be imparted to the release liner so that the release liner can be partially removed or removed in sections from the membrane.

Membrane Panel

In one or more embodiments, the membrane may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03.

Hot-Melt Curable Adhesives

In one or more embodiments, the curable hot-melt adhesive that may be used for forming the cured pressure-sensitive adhesive layer may be an acrylic-based hot-melt adhesive. These adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, the cured adhesive is characterized by physical crosslinks. While at least partially cured, the adhesive layer of one or more embodiments is essentially free of curative residue such as sulfur or sulfur crosslinks and/or phenolic compounds or phenolic-residue crosslinks.

In one or more embodiments, the pressure-sensitive adhesive layer may have a thickness of at least 1 mil, in other embodiments at least 2 mil, in other embodiments at least 3 mil, and in other embodiments at least 4 mil. In these or other embodiments, the pressure-sensitive adhesive layer has a thickness of at most 15 mil, in other embodiments at most 13 mil, and in other embodiments at most 11 mil. In one or more embodiments, the adhesive layer has a thickness of from about 1 to 15 mil, in other embodiments from about 2 to 13 mil, and in other embodiments from about 3 to 11 mil.

Release Liner

In one or more embodiments, release liner 17 includes a polymeric film or extrudate. This polymeric film or extrudate may include a single polymeric layer or may include two or more polymeric layers laminated or coextruded to one another. In other embodiments, release liner 17 includes a cellulosic substrate having a polymeric film or coating applied thereon, which film or coating may be referred to as a polymeric layer. The polymeric layer may be a single layer or include multiple layers.

Suitable materials for forming a release liner that is a polymeric film or extrudate include polypropylene, polyester, high-density polyethylene, medium-density polyethylene, low-density polyethylene, polystyrene or high-impact polystyrene. Suitable materials for forming a polymeric layer on a cellulosic-based release liner include siloxane-based materials, butadiene-based materials (e.g. styrene-butadiene rubber latex), as well as those polymeric materials employed to form a film or extrudate as described above. These polymeric materials may offer a number of advantageous properties including high moisture resistance, good resistance to temperature fluctuations during processing and storage, and increased tear and wrinkle resistance.

Preparation of Membrane Composite

The membrane panels employed in the membrane composites of the present invention may be prepared by conventional techniques. For example, thermoplastic membrane panels may be formed by the extrusion of thermoplastic compositions into one or more layers that can be laminated into a membrane panel. Alternatively, thermoset membranes can be formed using known calendering and curing techniques. Once the membrane is formed, the curable hot-melt adhesive can be extruded onto the membrane by using known apparatus such as adhesive coaters. The adhesive can then subsequently be cured by using, for example, UV radiation. The release film can be applied to the adhesive layer, and the membrane can then be subsequently rolled for storage and/or shipment.

As noted above, the adhesive is cured by using, for example, UV radiation. In accordance with practice of the present invention, the degree of cure between the central region and the lap regions of the adhesive layer 15 is adjusted. As the skilled person will understand, the degree of cure can be varied by varying the amount of energy (e.g., UV light energy) imparted to the coating within the respective regions of the coating. In one or more embodiments, the amount of UV radiation imparted to the lap regions is greater than the amount of UV radiation imparted to the central region of the adhesive coating.

In one or more embodiments, the amount of IN energy imparted to the lap regions is at least 1%, in other embodiments at least 3%, in other embodiments at least 5%, in other embodiments at least 10%, in other embodiments at least 15%, and in other embodiments at least 25% greater than the amount of energy imparted in the central region.

In one or more embodiments, the degree of cure in the lap regions is at least 1%, in other embodiments at least 3%, in other embodiments at least 5%, in other embodiments at least 10%, in other embodiments at least 15%, and in other embodiments at least 25% greater than the degree of cure in the central region. For example, skilled person understands that the degree of cure can be determined by determining gel content by solvent extraction methods at the reflux temperature of the solvent. Using these analytical techniques, the degree of cure in the lap region may be at least 85%, in other embodiments at least 88%, in other embodiments at least 90%, and in other embodiments at least 95%. In these or other embodiments, the degree of cure in the lap region is from about 85 to about 100%, or in other embodiments from about 88 to about 99%.

In one or more embodiments, the degree of cure in the central region may be at most 84%, in other embodiments at most 82%, in other embodiments at most 80%, and in other embodiments at most 78%. In these or other embodiments, the degree of cure in the central region is from about 50 to about 84%, in other embodiments from about 65 to about 82%, and in other embodiments from about 70 to about 80%.

In one or more embodiments, the level of cure in the lap regions, as compared to the level of cure in the central region, can be quantified based upon dead load shear, dead load peel, shear strength, peel strength, and etc. tests.

Application to a Roof Surface

The membrane composites of the present invention can advantageously be applied to a roof surface (also known as roof substrate) by using standard peel and stick techniques. For example, the membrane can be unrolled on a roof surface and placed into position. Portions of the membrane are then typically folded back and portions of the release liner are removed. The membrane can then subsequently be adhered to the roof surface by using various techniques including the use of rollers and the like to mate the adhesive to the substrate.

Additionally, where multiple membrane panels are employed, the membrane panels can be seamed to one another by over lapping the lap region and adhering the adhesive within the lap region to the top surface of the adjoining membrane. In one or more embodiments, the top surface of the adjoining membrane can be primed prior to seaming the membranes to one another.

In one or more embodiments, where the release liner includes multiple sections, as described above with respect to FIG. 2, installation of the membrane may include removal of the central portion 20 of release liner 17, which will expose the central region of the adhesive for purposes of securing the membrane to the roof deck. In a subsequent step, which may follow priming the top surface of adjacent membranes, the lap regions 22 and 22' of release liner 17 can be removed to expose the lap regions (21, 23) and thereby allow for the formation of a lap seam with the adjoining membranes.

It has advantageously been discovered that the pressure-sensitive adhesive layer employed in the membranes of the present invention, especially with respect to the adhesive within the center portion and the degree of cure associated therewith, allows the membranes to be adhered to a variety of roofing surfaces. These include, but are not limited to, wood decks, concrete decks, steel decks, faced construction boards, and existing membrane surfaces. In particular embodiments, the membranes of the present invention are adhered, through the cured adhesive layer disclosed herein, to a faced construction board such as, but not limited to, polyisocyanurate insulation boards or cover boards that include facers prepared from polar materials. For example, the adhesives of the present invention provide advantageous adhesion to facers that contain cellulosic materials and/or glass materials. It is believed that the polar nature of the adhesive is highly compatible with the polar nature of these facer materials and/or any adhesives or coatings that may be carried by glass or paper facers. Accordingly, embodiments of the present invention are directed toward a roof deck including a construction board having a cellulosic or glass facer and a membrane secured to the construction board through an at least partially cured polyacrylate adhesive layer in contact with a glass or cellulosic facer of the construction board.

In order to demonstrate aspects of the present invention, the following experiments were conducted. These experiments, however, are not intended to limit the scope of the invention, which is provided in the claims.

EXAMPLES

Samples of EPDM rubber membrane were prepared by applying a layer of melt-extrudable, UV-curable pressure-sensitive coating composition to a planar surface of the membrane sample. The pressure-sensitive coating was believed to be an polyacrylate-based adhesive obtained from BASF. The layer of pressure-sensitive adhesive was about 6-10 mil thick. The coating was then cured by subjecting it to UV light at different doses as provided in the Table.

To determine the degree of cure, the following procedure was followed. A portion of the test specimen was obtained and the original weight of the obtained portion was recorded. This sample was then extracted in a Soxhlet apparatus. Approximately 150 mL of THF was added to 250 mL Kimble boiling flasks, and boiling stones were added. Samples were allowed to reflux for a period of 3 hours. The thimbles were then removed, and placed under a fume hood overnight to allow the THF to evaporate. The samples were then weighed. During the extraction, the uncured portion of the pressure sensitive adhesive dissolved into the THF, leaving the cured (gel) portion behind. After extraction, samples were dried overnight. The samples were then weighed to determine the cured content. The soluble content was determined by subtracting the cured % from the total.

The remainder of the prepared samples was used to conduct peel strength tests generally in accordance with ASTM D413 to replicate seam tests where the adhesive was used to secure the composite to an EPDM membrane that was primed with a commercial primer, and ASTM D1970 to replicate adhesion to substrate tests where the adhesive was used to secure the composite to a polyisocyanurate insulation board having a paper facer. The test samples were allowed to set at room temperature for about 24 hours, and then the sample was pulled apart using an Instron apparatus.

TABLE

| Sample# | UV dose mJ/cm2 | Cure extend % cured | Center of EPDM | | Seam of EPDM | | Remarks |
| --- | --- | --- | --- | --- | --- | --- | --- |
| | | | Peel strength on ISO facer (paper) pli | Spec of peel on ISO pli | Peel on EPDM at Seam* pli | Spec of peel at seam pli | |
| example 1 | 95 | 77 | 3.36 | 1.0 | 2.3 | 4.5 | Center part passed spec, seam part failed. |
| example 2 | 114 | 78 | 2.32 | 1.0 | 4.0 | 4.5 | Center part passed spec, seam part failed. |
| example 3 | 165 | 96 | 0.89 | 1.0 | 5.2 | 4.5 | Center failed spec, seam part passed. |
| example 4 | 198 | 98 | 0.84 | 1.0 | 6.2 | 4.5 | Center failed spec, seam part passed. |

As shown in the Table, where the cure was 77% or 78%, the peel strength in the seam did not meet the desired specification. The adhesion to the substrate, however, met specifications. On the other hand, where the cure was 96% or 98%, the peel strength in the seam did meet desired specifications, but the adhesion to the substrate did not meet desired specifications.

Various modifications and alterations that do not depart from the scope and spirit of this invention will become apparent to those skilled in the art. This invention is not to be duly limited to the illustrative embodiments set forth herein.

What is claimed is:

1. A roofing membrane composite comprising:
   a. a polymeric roofing membrane panel having a planar surface that includes a central region and a lap region, where the lap region extends along a lateral edge of the roofing membrane;
   b. a single adhesive layer disposed on said lap region and said central region; and c. a release liner disposed on said adhesive layer, where the adhesive layer is a single pressure-sensitive adhesive composition that is at least partially cured, and includes at least two distinct regions differing only in the amount of crosslinking.

2. The membrane composite of claim 1, where the adhesive layer is in contact with substantially all of one planar surface of the membrane panel.

3. The membrane composite of claim 1, where the adhesive layer includes a UV-cured acrylic resin.

4. The membrane composite of claim 1, where the polymeric membrane includes a second lap region that extends along a second lateral edge of the roofing membrane.

5. The membrane composite of claim 4, where the adhesive that is disposed on the first lap region and optional second lap region have a higher state of cure than the adhesive that is disposed on the central region.

6. The membrane composite of claim 5, where the cure state within the adhesive that is disposed on the lap region is at least 1% higher than in the adhesive that is disposed on the central region.

7. The membrane composite of claim 6, where the cure state within the adhesive that is disposed on the lap region is at least 5% higher than in the adhesive that is disposed on central region.

8. The membrane composite of claim 7, where the cure state within the adhesive that is disposed on the lap region is at least 10% higher than in the adhesive that is disposed on central region.

9. The membrane composite of claim 5, where the cure state within the adhesive that is disposed on the lap region is at least 85% of full cure for the adhesive.

10. The membrane composite of claim 9, where the cure state within the adhesive that is disposed on the lap region is at least 90% of full cure for the adhesive.

11. The membrane composite of claim 5, where the cure state within the adhesive that is disposed on the central region is at most 84% of full cure for the adhesive.

12. The membrane composite of claim 11, where the cure state within the adhesive that is disposed on the central region is at most 80% of full cure for the adhesive.

13. The membrane composite of claim 1, prepared by a process comprising the steps of:
   applying the adhesive layer to the entire planar surface of the polymer membrane;
   at least partially curing the adhesive layer by using UV radiation, wherein the amount of UV radiation imparted to the adhesive that is disposed on the lap region is greater than the amount of UV radiation that is imparted to the adhesive that is disposed on the central region of the membrane.

14. The membrane composite of claim 1, where the thickness of the adhesive layer is from about 3 mil to about 15 mil.

* * * * *